United States Patent
Nagadomi

(10) Patent No.: US 8,364,884 B2
(45) Date of Patent: Jan. 29, 2013

(54) MEMORY SYSTEM WITH A MEMORY CONTROLLER CONTROLLING PARALLELISM OF DRIVING MEMORIES

(75) Inventor: Yasushi Nagadomi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 563 days.

(21) Appl. No.: 12/528,816

(22) PCT Filed: Jan. 20, 2009

(86) PCT No.: PCT/JP2009/051139
§ 371 (c)(1),
(2), (4) Date: Aug. 27, 2009

(87) PCT Pub. No.: WO2009/107426
PCT Pub. Date: Sep. 3, 2009

(65) Prior Publication Data
US 2010/0017562 A1    Jan. 21, 2010

(30) Foreign Application Priority Data
Feb. 29, 2008   (JP) .................. 2008-051285

(51) Int. Cl.
G06F 12/00    (2006.01)
(52) U.S. Cl. ...................................... 711/103
(58) Field of Classification Search .................. None
See application file for complete search history.

(56) References Cited

U.S. PATENT DOCUMENTS

| | | |
|---|---|---|
| 6,272,610 B1 | 8/2001 | Katayama et al. |
| 6,513,093 B1 * | 1/2003 | Chen et al. ............ 711/4 |
| 7,024,514 B2 | 4/2006 | Mukaida et al. |
| 7,587,538 B2 * | 9/2009 | Flake et al. ............ 710/74 |

(Continued)

FOREIGN PATENT DOCUMENTS

| | | |
|---|---|---|
| JP | 10 187359 | 7/1998 |
| JP | 2006 195569 | 7/2006 |

(Continued)

OTHER PUBLICATIONS

Japanese Office Action issued May 8, 2012, in Japan Patent Application No. 2008-051285 (with English translation).

(Continued)

*Primary Examiner* — Kevin Verbrugge
*Assistant Examiner* — Stella Eun
(74) *Attorney, Agent, or Firm* — Oblon, Spivak, McClelland, Maier & Neustadt, L.L.P.

(57) ABSTRACT

To provide a memory system that can store data smaller than a block size and data larger than the block size without deteriorating writing efficiency, and can dynamically change a parallelism according to the data. The memory system according to an embodiment of the present invention comprises a DRAM 11, a NAND memory 12, and a controller having a NAND-controller control register 150 that specifies parallel-operating element specifying information indicating parallel operating elements 120A to 120D in the NAND memory 12 to be used at the time of data access and an address of data with respect to a NAND interface 140, the NAND interface 140 connected in parallel to the respective parallel operating elements 120A to 120D for accessing the address of one or a plurality of parallel operating elements 120A to 120D selected based on the specified parallel-operating element specifying information and the address, and a CPU 131 that sets the parallel-operating element specifying information in the NAND-controller control register 150 according to the type of data to be accessed.

18 Claims, 12 Drawing Sheets

U.S. PATENT DOCUMENTS

| | | |
|---|---|---|
| 7,647,470 B2 * | 1/2010 | Sasaki et al. ............... 711/203 |
| 7,865,772 B2 * | 1/2011 | Mogi et al. ............... 714/20 |
| 2005/0144357 A1 | 6/2005 | Sinclair |
| 2005/0144361 A1 * | 6/2005 | Gonzalez et al. ............ 711/103 |
| 2005/0144363 A1 | 6/2005 | Sinclair |
| 2005/0144367 A1 | 6/2005 | Sinclair |
| 2006/0047889 A1 | 3/2006 | Sasaki et al. |
| 2006/0064539 A1 | 3/2006 | Mukaida et al. |
| 2006/0184758 A1 * | 8/2006 | Satori et al. ............... 711/168 |
| 2007/0168625 A1 | 7/2007 | Cornwell et al. |

FOREIGN PATENT DOCUMENTS

| | | |
|---|---|---|
| JP | 2007-517320 | 6/2007 |
| JP | 2007-517325 | 6/2007 |
| JP | 2007 279402 | 10/2007 |
| WO | 2005 066770 | 7/2005 |

OTHER PUBLICATIONS

Supplementary European Search Report issued Oct. 17, 2012, in European Patent Application No. EP 09 713 662.6.

* cited by examiner (a) Ch0 ADDRESS: 5001 (INVALID ADDRESS)
Ch1 ADDRESS: 5001 (INVALID ADDRESS)
Ch2 ADDRESS: 3 (VALID ADDRESS)
Ch3 ADDRESS: 5001 (INVALID ADDRESS)
⇒ DETERMINE AS PARALLELISM 1/Ch 2 ACCESS (b) Ch0 ADDRESS: 3 (VALID ADDRESS)
Ch1 ADDRESS: 4 (VALID ADDRESS)
Ch2 ADDRESS: 3 (VALID ADDRESS)
Ch3 ADDRESS: 8 (VALID ADDRESS)
⇒ DETERMINE AS PARALLELISM 4 ACCESS (a)
ChO ADDRESS: 2 (INVALID ADDRESS)
Ch1 ADDRESS: 2 (INVALID ADDRESS)
Ch2 ADDRESS: 2 (VALID ADDRESS)
Ch3 ADDRESS: 2 (INVALID ADDRESS)
⇒ DETERMINE AS PARALLELISM 1/Ch 2 ACCESS (b)
ChO ADDRESS: 4 (VALID ADDRESS)
Ch1 ADDRESS: 1 (VALID ADDRESS)
Ch2 ADDRESS: 2 (VALID ADDRESS)
Ch3 ADDRESS: 3 (VALID ADDRESS)
⇒ DETERMINE AS PARALLELISM 4 ACCESS

MEMORY SYSTEM WITH A MEMORY CONTROLLER CONTROLLING PARALLELISM OF DRIVING MEMORIES

TECHNICAL FIELD

The present invention relates to a memory system configured by using a nonvolatile semiconductor memory.

BACKGROUND ART

Recently, NAND-type flash memory has attracted attention as a type of nonvolatile semiconductor memory. Writing/erasing operations of the NAND-type flash memory are faster than those of NOR-type flash memory. Further, due to the development of manufacturing techniques of semiconductor devices, downsizing of semiconductor elements has been advanced, and memory capacity per unit area has been increasing. Large capacity memory systems using the NAND-type flash memory have been already commercialized.

Generally in a NAND-type flash memory, a plurality of pages are collected to form one block. A writing/reading process is performed in a unit of page, and an erasing process is performed in a unit of block (for example, see Patent Document 1).

Further, with recent development of information technology, many large capacity files, for example, of a size exceeding several megabytes, such as image files, music files, and video files are stored in a secondary storage device such as a personal computer. In the case of applying a memory system using a NAND-type flash memory, for example, with a page size of 4 kilobytes as the secondary storage device, and when a file considerably larger than a page size, which is a write unit in the NAND-type flash memory, is written, there is a problem that writing must be performed for each page (4 kilobytes), and therefore it requires a long time for writing the file. On the other hand, if a write size per page is increased to improve the efficiency of writing of a large-capacity file, an unused area is generated in a page at the time of writing a file smaller than the page size.

Further, a rewriting process of data in the NAND-type flash memory requires processes of saving the data once in a memory such as a dynamic random access memory (DRAM), updating a page to be rewritten on the memory, writing data constituting a block including the updated page in a block from which data has already been erased and different from the block currently storing the data, and erasing an original block. Therefore, at the time of writing a file having a small capacity as compared to the block size and having high rewriting frequency, an unused area is generated in a page and the number of useless erasure increases. Accordingly, the writing efficiency, which is a ratio of an amount of data erased to an amount of data written, decreases to deteriorate a cell constituting the block.

Japanese Patent Application Laid-open No. 2007-279402

It is an object of the present invention to provide a memory system that can store data smaller than a block size as well as data larger than the block size, without deteriorating the writing efficiency.

DISCLOSURE OF INVENTION

A memory system according to an embodiment of the present invention comprises: a volatile first storage unit; a nonvolatile second storage unit that stores data transmitted from a host device via the first storage unit, in which a memory area includes a plurality of parallel operating elements; and a controller that performs data transfer between the first storage unit and the second storage unit, or within the second storage unit, wherein the controller includes: an interface specifying unit that specifies parallel-operating element specifying information indicating the parallel operating element in the second storage unit to be used for accessing the data and an address of the data to be accessed, with respect to an interface unit; the interface unit connected in parallel to the respective parallel operating elements in the second storage unit for accessing the address of one or a plurality of parallel operating elements in the second storage unit, selected based on the parallel-operating element specifying information and the address specified by the interface specifying unit; and a control unit that sets the parallel-operating element specifying information used for the data access to the interface specifying unit according to type of the data to be accessed, at a time of data access.

A memory system according to an embodiment of the present invention comprises: a volatile first storage unit; a nonvolatile second storage unit that stores data transmitted from a host device via the first storage unit, in which a memory area includes a plurality of parallel operating elements; and a controller that includes: an interface specifying unit that specifies an address to be used for accessing the data with respect to an interface unit; the interface unit connected in parallel to the respective parallel operating elements in the second storage unit for accessing the data based on the address specified by the interface specifying unit; and a control unit that sets the address of a destination in the second storage unit to the interface specifying unit at the time of data access, and that controls transfer of data between the first storage unit and the second storage unit, or within the second storage unit, wherein the control unit determines the parallel operating element to be used for the data access between the interface unit and the second storage unit according to the type of the data to be accessed at the time of the data access, and sets a valid address for the parallel operating element to be used and an invalid address for the parallel operating element not to be used, with respect to the interface specifying unit.

BRIEF DESCRIPTION OF DRAWINGS

FIGS. 9(a) and 9(b) are an example of an addressing method according to the second embodiment;

FIGS. 11(a) and 11(b) are an example of an address specifying method according to the third embodiment;

BEST MODE(S) FOR CARRYING OUT THE INVENTION

Exemplary embodiments of a memory system according to the present invention will be explained below in detail with reference to the accompanying drawings. The present invention is not limited to the embodiments.

Figure 1:
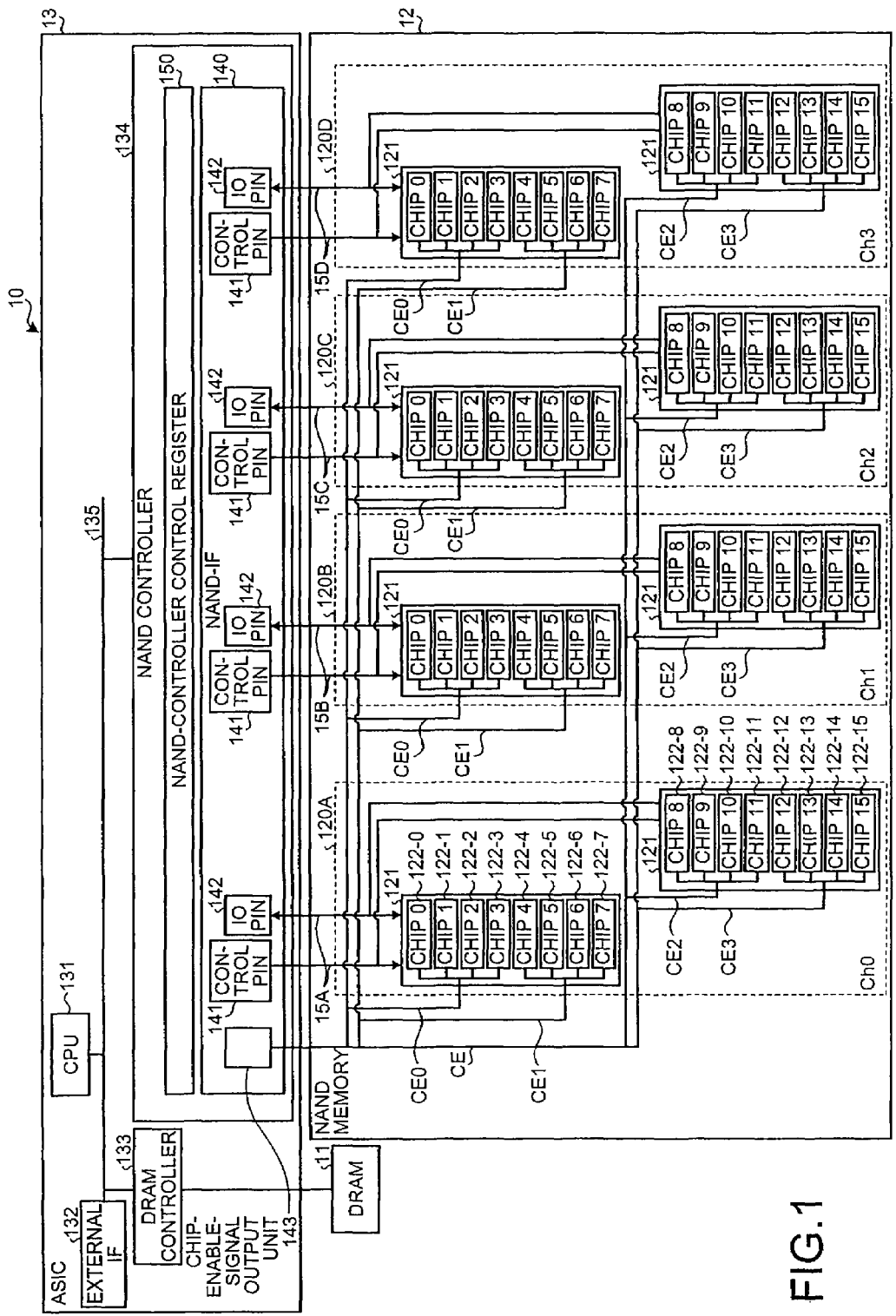
FIG. 1 is a block diagram of one example of a configuration of a memory system according to a first embodiment of the present invention.

A memory system according to a first embodiment of the present invention includes a nonvolatile semiconductor memory, and is used as a secondary storage device (solid state drive (SSD)) of a host device such as a personal computer. The memory system has a function for storing data, for which a writing request has been issued from the host device, and reading data, for which a reading request has been issued from the host device, to output the data to the host device. FIG. 1 is a block diagram of one example of a configuration of the memory system according to the first embodiment. A memory system 10 includes a DRAM 11 as a first storage unit, a NAND-type flash memory (hereinafter, "NAND memory") 12 as a second storage unit, and a drive control circuit (denoted as "ASIC" in the drawings) 13.

The DRAM 11 is used as a storage unit for data transfer or for recording management information. Specifically, the storage unit for data transfer is used for temporarily storing data, for which a writing request has been issued from the host device, before writing the data in the NAND memory 12, or for reading the data, for which a reading request has been issued from the host device, from the NAND memory 12 and temporarily storing the data. The storage unit that records the management information is used for storing management information for managing a storage position of the data to be stored in the DRAM 11 and the NAND memory 12.

The NAND memory 12 is used as the storage unit for storing data. Specifically, the NAND memory 12 stores data from the host device or stores the management information managed by the DRAM 11 for backup. FIG. 1 depicts a case that the NAND memory 12 includes four parallel operating elements 120A to 120D. Each one of parallel operating elements 120A to 120D includes two packages 121 in which eight chips 122 having a memory capacity of predetermined size are put into one. The two packages 121 in one parallel operating element shares a control pin 141 and an input/output pin 142 of a NAND controller 134, and are connected to the drive control circuit 13 in parallel via a bus. The bus connected to the respective parallel operating elements 120A to 120D function as channels 15A to 15D at the time of transferring the data. In the explanations below, a width of the respective buses to be connected to the respective parallel operating elements 120A to 120D is assumed to be 8 bits.

The drive control circuit 13 controls the DRAM 11 and the NAND memory 12. In the first embodiment, the drive control circuit 13 has such a configuration that a central processing unit (CPU) 131 that performs various types of processing, an external interface (denoted as external IF in the drawings) 132 that transfers data between an external device such as the host device and the drive control circuit 13, a DRAM controller 133 that controls the DRAM 11, and the NAND controller 134 that controls the NAND memory 12 are connected with each other via an internal bus 135.

The NAND controller 134 includes a NAND interface (denoted as NAND-IF in the drawings) 140 that transfers the data between the NAND memory 12 and the NAND controller 134, and a NAND-controller control register 150 that controls the operation of the NAND controller 134. The NAND interface 140 has the control pin 141 and the input and output (IO) pin 142 for each of the parallel operating elements 120A to 120D constituting the NAND memory 12, and is connected to the parallel operating elements 120A to 120D via the channels 15A to 15D. The NAND interface 140 has a chip-enable-signal output unit 143, and is connected to the respective parallel operating elements 120A to 120D. In an example shown in FIG. 1, a chip enable signal line CE0 connected to chips 122-0 to 122-3 of the respective parallel operating elements 120A to 120D, a chip enable signal line CE1 connected to chips 122-4 to 122-7, a chip enable signal line CE2 connected to chips 122-8 to 122-11, and a chip enable signal line CE3 connected to chips 122-12 to 122-15 are provided.

Figure 2:
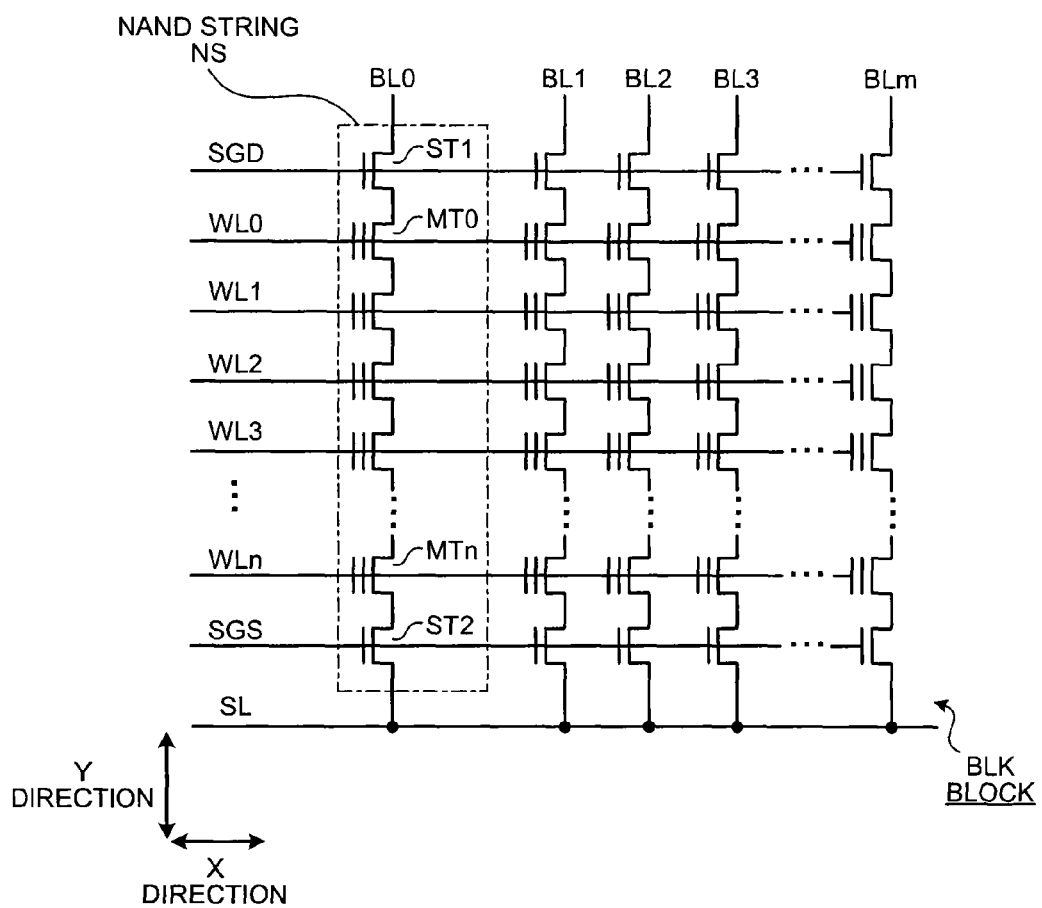
FIG. 2 is a circuit diagram of one configuration example of one block included in a NAND memory.

A configuration of the NAND memory 12 is explained here. The NAND memory 12 is configured by arranging a plurality of blocks, which is a unit of data erasure, on a substrate. FIG. 2 is a circuit diagram of one configuration example of one block included in the NAND memory. In FIG. 2, right and left direction on the drawing is designated as an X direction, and a direction vertical to the X direction on the drawing is designated as a Y direction.

Each block BLK of the NAND memory 12 includes (m+1) NAND strings NS (m is an integer equal to or larger than 0) arranged sequentially along the X direction. The respective NAND strings NS include (n+1) (n is an integer equal to or larger than 0) memory cell transistors MT0 to MTn and selection transistors ST1 and ST2 arranged on opposite ends of a line of the (n+1) memory cell transistors MT0 to MTn.

The respective memory cell transistors MT0 to MTn include a field effect transistor having a laminate gate structure formed on a semiconductor substrate. The laminate gate structure includes a charge accumulating layer (floating gate electrode) formed on the semiconductor substrate with a gate dielectric film put therebetween, and a control gate electrode formed on the charge accumulating layer with an intergate dielectric film therebetween. The memory cell transistors MT0 to MTn are respectively a multi-level memory, in which a threshold voltage changes according to the number of electrons accumulated in the floating gate electrode, and data equal to or larger than 2 bits can be stored according to a difference of the threshold voltage. In the embodiments described below, a case that the memory cell transistor MT is the multi-level memory is explained as an example; however, the memory cell transistor MT can have a structure for storing 1 bit (binary).

Word lines WL0 to WLn are respectively connected to the control gate electrodes of the memory cell transistors MT0 to MTn constituting the NAND string NS, and the memory cell transistors MTi (i=0 to n) in respective NAND strings NS are commonly connected with each other by the same word lines WLi (i=0 to n). That is, the control gate electrodes of the memory cell transistors MTi on the same line in the block BLK are connected to the same word line WLi. The (m+1) memory cell transistors MTi connected to the same word line WLi are handled as one page, and the page becomes a minimum unit of writing and reading of data in the NAND memory 12.

The respective bit lines BL0 to BLm are connected to a drain of each of the (m+1) selection transistors ST1 in one block BLK, and a selection gate line SGD is commonly connected to the gate thereof. A source of the selection transistor ST1 is connected to the drain of the memory cell transistor MT0. Likewise, a source line SL is commonly connected to the source of each of the (m+1) selection transistors ST2 in one block BLK, and a selection gate line SGS is commonly connected to the gate thereof. The drain of the selection transistor ST2 is connected to the source of the memory cell transistor MTn.

Although not shown, a bit line BLj (j=0 to m) in one block BLK commonly connects to the drains of the selection transistors ST1 among the bit lines BLj of other blocks BLK. That is, the NAND strings NS on the same line in a plurality of blocks BLK are connected by the same bit line BLj.

In the NAND memory 12, the minimum unit of writing and reading is the page including the memory cell transistors MTi connected to the same word line WLi, and the minimum unit of erasure is one block (physical block) including a predetermined number of pages. A plurality of blocks constitutes a plane together, and a plurality of planes constitutes one of parallel operating elements 120A to 120D. The parallel operating elements 120A to 120D constitutes one NAND memory 12. In an example shown in FIG. 1, a case that the number of the parallel operating elements (that is, the number of channels) is four and the number of planes is 2 is shown. The chips 122 constitute the parallel operating elements 120A to 120D; however, the plane and the block are present together in one chip 122.

The respective parallel operating elements 120A to 120D constituting the NAND memory 12 can operate in any mode of a normal mode and a double speed mode at the time of writing and reading. In the normal mode, writing and reading of data is performed for each block in one of parallel operating elements 120A to 120D. For example, writing of data to the block corresponding to a first plane in one parallel operating element is performed in a unit of page with respect to an instructed block, after the data is accumulated for one page in a buffer for the first plane. Likewise, writing of data to the block corresponding to the second plane is performed in a unit of page with respect to the instructed block, after the data is accumulated for one page in a buffer for the second plane. Reading of data is also performed for one page.

The double speed mode is for simultaneously performing writing and reading of data for two blocks by using respective blocks in two planes in one of the parallel operating elements 120A to 120D. For example, when writing of data for two blocks is to be performed with respect to one parallel operating element, data for one page of the first block is accumulated in the buffer for the first plane, and data for one page of the second block is accumulated in the buffer for the second plane. The pieces of data accumulated in the buffers for the first and second planes are then written in the first block of the first plane and the second block of the second plane, respectively (executes a program). In this manner, the data for two pages can be written in one program time. Reading of data can be performed in the same manner.

Because the parallel operating elements 120A to 120D are respectively connected to the drive control circuit 13 in parallel via the channel, the parallel operating elements 120A to 120D can be accessed in parallel, or the data can be transferred only to one channel to access the parallel operating element.

In the first embodiment, in the case of FIG. 1, writing/reading speed of data and a parallelism of channels are combined, to provide two types of access modes.

(1) 8-Bit Normal Mode

In this mode, only one channel of the four channels connected to the drive control circuit 13 is operated to perform writing and reading in a unit of 8 bits with respect to the blocks of one parallel operating element. A unit of writing/reading size of data is page size, and a unit of erasure size is one physical block size.

(2) 32-Bit Double Speed Mode

In this mode, four channels connected to the drive control circuit 13 are operated in parallel, and reading and writing are performed by using the double speed mode using two planes of the respective parallel operating elements. A unit of writing/reading size of data is "page size×4 channels×2", and a unit of erasure size is 8-physical block size.

Figure 3:
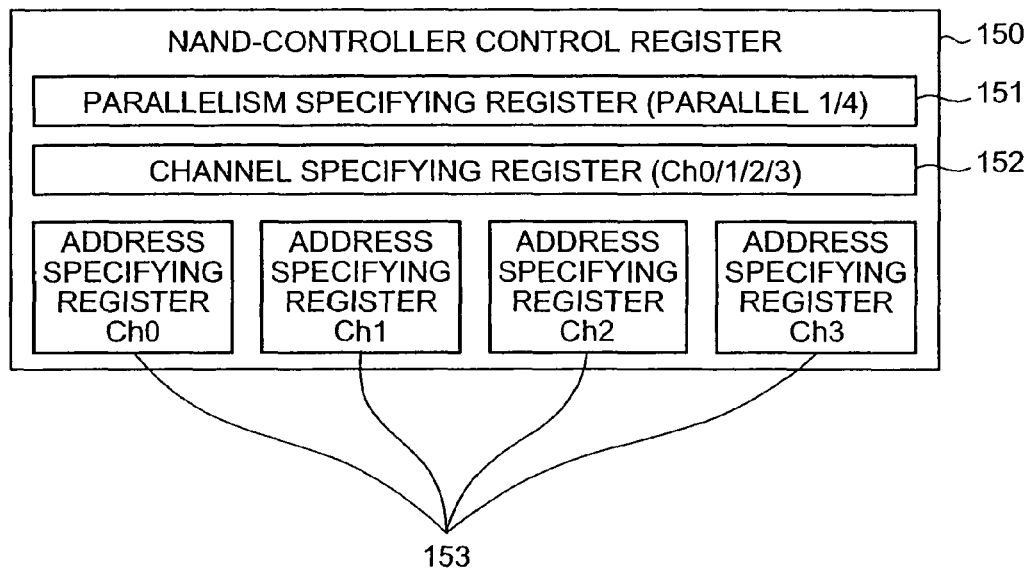
FIG. 3 is one configuration example of a NAND-controller control register according to the first embodiment.

Writing and reading of data to the NAND memory 12 can be performed by specifying an address at the time of writing the data to the NAND memory 12, other than the two types of access modes. FIG. 3 is one configuration example of the NAND-controller control register according to the first embodiment. The NAND-controller control register 150 includes a parallelism specifying register 151, a channel specifying register 152, and an address specifying register 153.

The parallelism specifying register 151 sets the number of channels for performing writing and reading at a time, that is, the parallelism. In this case, either one of one channel and four channels can be set. When one channel is set, the speed of reading and writing becomes that of the normal mode as a necessity, and when four channels are set, the speed of reading and writing becomes that of the double speed mode. That is, when one channel is set by the parallelism specifying register 151, the access mode is 8-bit normal mode, and when four channels are set, the access mode is 32-bit double speed mode.

The channel specifying register 152 sets the channel to be used at the time of access without using all the channels simultaneously. In this example, when one channel is set by the parallelism specifying register 151, one channel that performs a writing/reading process or an erasing process is set from the channels 15A to 15D. When four channels 15A to 15D are set by the parallelism specifying register 151, the channel specifying register 152 indicates "no specification".

The address specifying register 153 sets an address on the parallel operating elements 120A to 120D that performs the writing/reading process or the erasing process.

Figure 4:
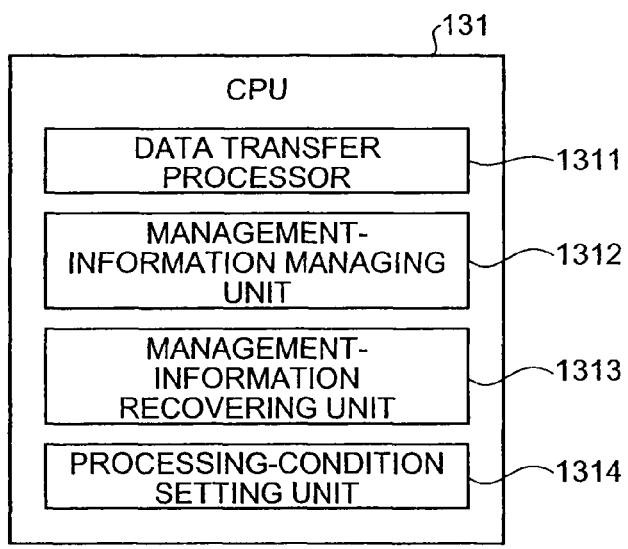
FIG. 4 is a block diagram of one example of a functional configuration of a CPU.

A function for the CPU 131 to be set in the NAND-controller control register 150 is explained next. FIG. 4 is a block diagram of one example of a functional configuration of the CPU. The CPU 131 includes a data transfer processor 1311 that performs data transfer between the DRAM 11 and the NAND memory 12, a management-information managing unit 1312 that changes or stores the management information with a change of the data to be stored in the DRAM 11 and the NAND memory 12, a management-information recovering unit 1313 that recovers the latest management information based on the management information stored in the NAND memory 12 at the time of power ON, and a processing-condition setting unit 1314 that performs setting of an accessing condition with respect to the NAND memory 12 to the NAND-contoller control register 150.

The processing-condition setting unit 1314 performs setting with respect to the NAND-controller control register 150 according to the type of data to be written in the NAND memory 12 or the type of data to be read from the NAND memory 12. In an example explained below, the processing-condition setting unit 1314 can set such that in the case of data to which an access is instructed from the host device, the processes are performed in the 32-bit double speed mode, and when the data generated in the memory system 10 is written or read, the processes are performed in the 8-bit normal mode.

There is management-information storage information, which is a backup of the management information for managing the storage position of the data to be stored in the NAND memory 12, as the data generated in the memory system 10 when the processes are performed in the 8-bit normal mode. The management information is managed on the DRAM 11 by the management-information managing unit 1312 in the CPU 131. The management-information managing unit 1312 stores a snapshot, which is a copy of the management information at a certain point in time, and a log, which is difference information of the management information before and after a change, when the change occurs in the management information, as the management-information storage information in the NAND memory 12. Normally, when the memory system 10 is being operated, a command (flush cache command) for saving the management information on the DRAM 11 in the NAND memory 12 is frequently issued, and the log, which is an update of the management information, is written in the NAND memory 12. At the time of power OFF, the management information on the DRAM 11 is written in the NAND memory 12 as the snapshot.

Figure 5:
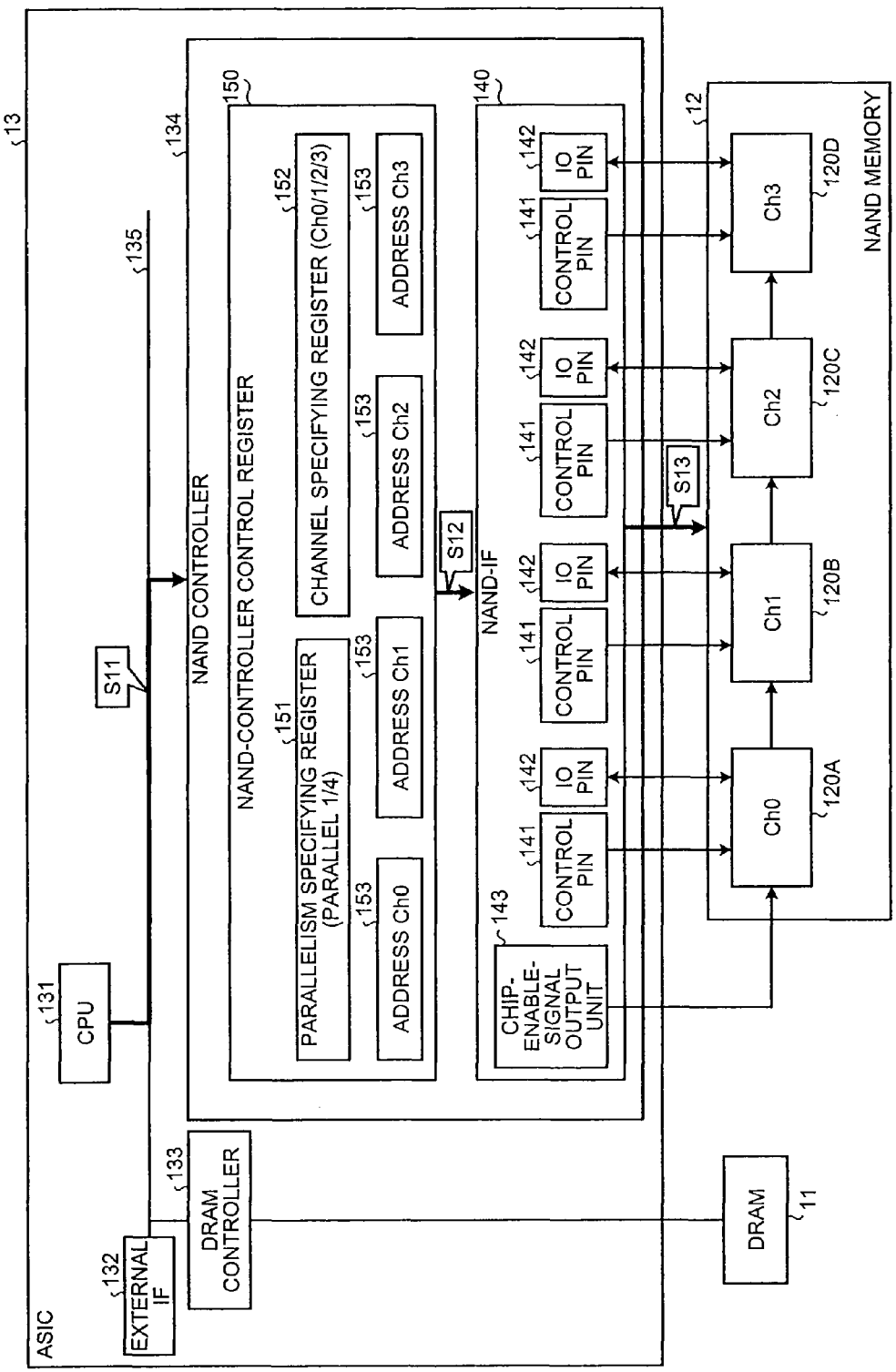
FIG. 5 is one example of a data transfer process in the memory system.

A data transfer operation in the memory system 10 is explained next. FIG. 5 is one example of a data transfer process in the memory system. In this example, a case that the data transfer is performed between the DRAM 11 and the NAND memory 12 is explained. The processing-condition setting unit 1314 in the CPU 131 obtains the type of data transferred between the DRAM 11 and the NAND memory 12 and the address (chip 122) to be accessed on the NAND memory 12.

The processing-condition setting unit 1314 determines the type of data to set the parallelism ("1" or "4") with respect to the parallelism specifying register 151 in the NAND-controller control register 150. That is, the processing-condition setting unit 1314 sets the parallelism to "4" in the case of data requested from the host device, and sets the parallelism to "1" in the case of writing or reading of data generated in the memory system 10. The processing-condition setting unit 1314 sets the channel to be used by the NAND memory 12 (when the parallelism is "1", any one of channels, and when the parallelism is "4", "no specification") to the channel specifying register 152 based on a destination address of the data, and sets the destination address to the address specifying register 153 (Step S11). When setting to the NAND-controller control register 150 by the processing-condition setting unit 1314 is complete, data transfer between the DRAM 11 and the NAND memory 12 is started by the data transfer processor 1311.

Thereafter, the NAND-controller control register 150 transfers a value of the parallelism specifying register 151 and a value of the channel specifying register 152 to the NAND interface 140 (Step S12). The NAND interface 140 controls the channel specified by the parallelism specifying register 151 and the channel specifying register 152. The NAND interface 140 then performs control for accessing the data at the address specified by the address specifying register 153 (Step S13). Accordingly, transfer of data transferred between the DRAM 11 and the NAND memory 12 is controlled.

Figure 6:
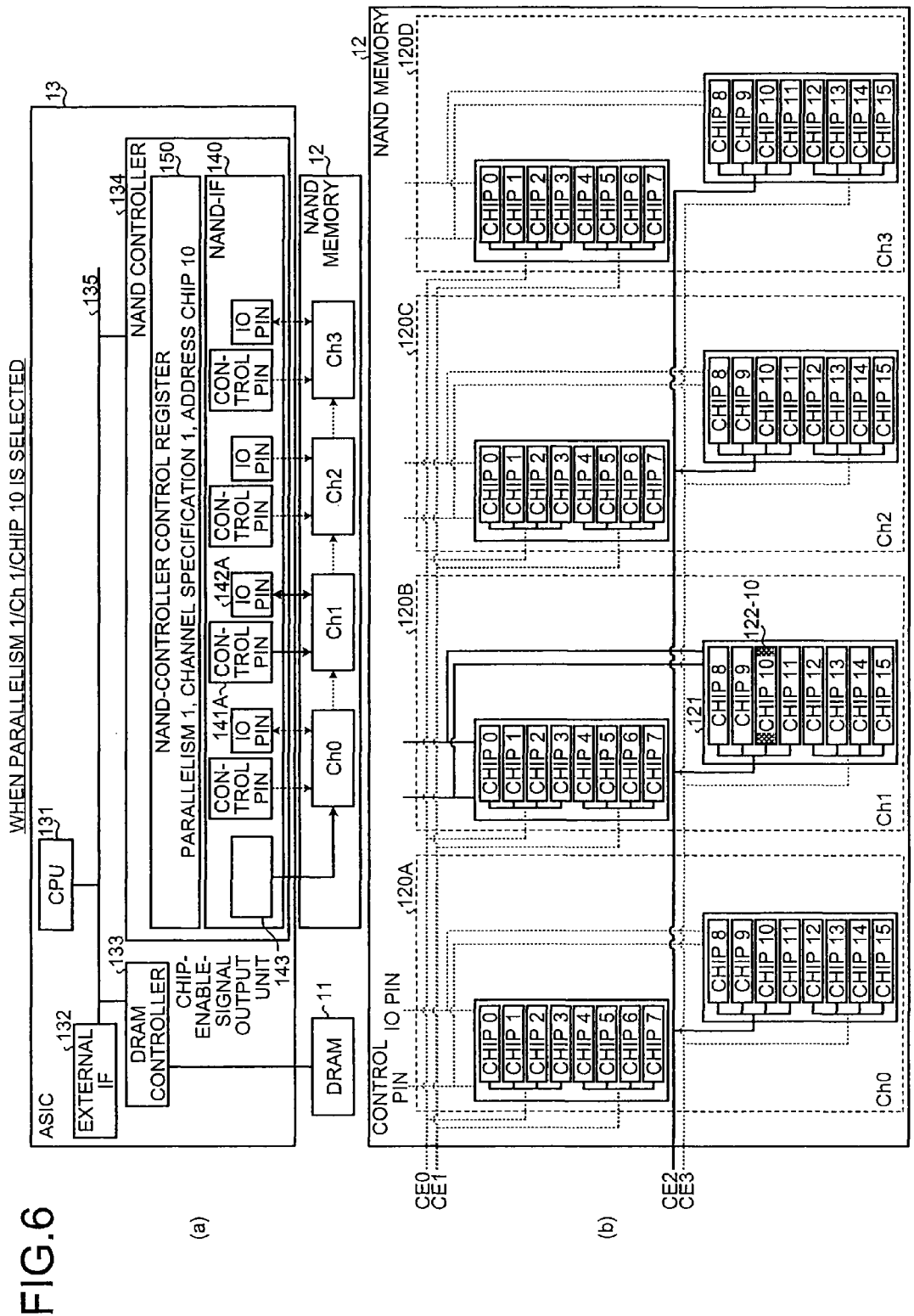
FIGS. 6(a) and 6(b) depict a processing state of data access control in a case of an 8-bit normal mode.

A data-access control process performed by the NAND controller 134 at Steps S12 and S13 is explained sequentially for the case of the 8-bit normal mode and the case of the 32-bit double speed mode. FIGS. 6(a) and 6(b) depict a processing state of data access control in the case of the 8-bit normal mode, where FIG. 6(a) depicts an outline of data access control state between the NAND controller and the NAND memory, and FIG. 6(b) depicts an input state of a signal to respective chips constituting the NAND memory. An example in which "1" is set as the parallelism (that is, the 8-bit normal mode is set), "Ch1" (parallel operating element 120B) is specified as the channel, and "chip 122-10" is specified as the address is explained here. However, in practice, instead of the chip, an address in the chip 122 (the parallel operating elements 120A to 120D) is specified as the address.

As shown in FIG. 6(a), the NAND interface 140 controls a control pin 141A and an input/output pin 142A so that the signal is transmitted only to Ch1, upon reception of the value of the parallelism specifying register 151 and the value of the channel specifying register 152 from the NAND-controller control register 150. Further, as shown in FIG. 6(b), the chip-enable-signal output unit 143 in the NAND interface 140 supplies a chip enable signal only to the address in the chip 122-10 specified by the address specifying register 153 via the chip enable signal line CE2. Accordingly, data transfer in the normal mode is performed, not in a parallel mode, between the DRAM 11 and a predetermined address in the chip 122-10 of the parallel operating element 120B in the NAND memory 12.

Figure 7:
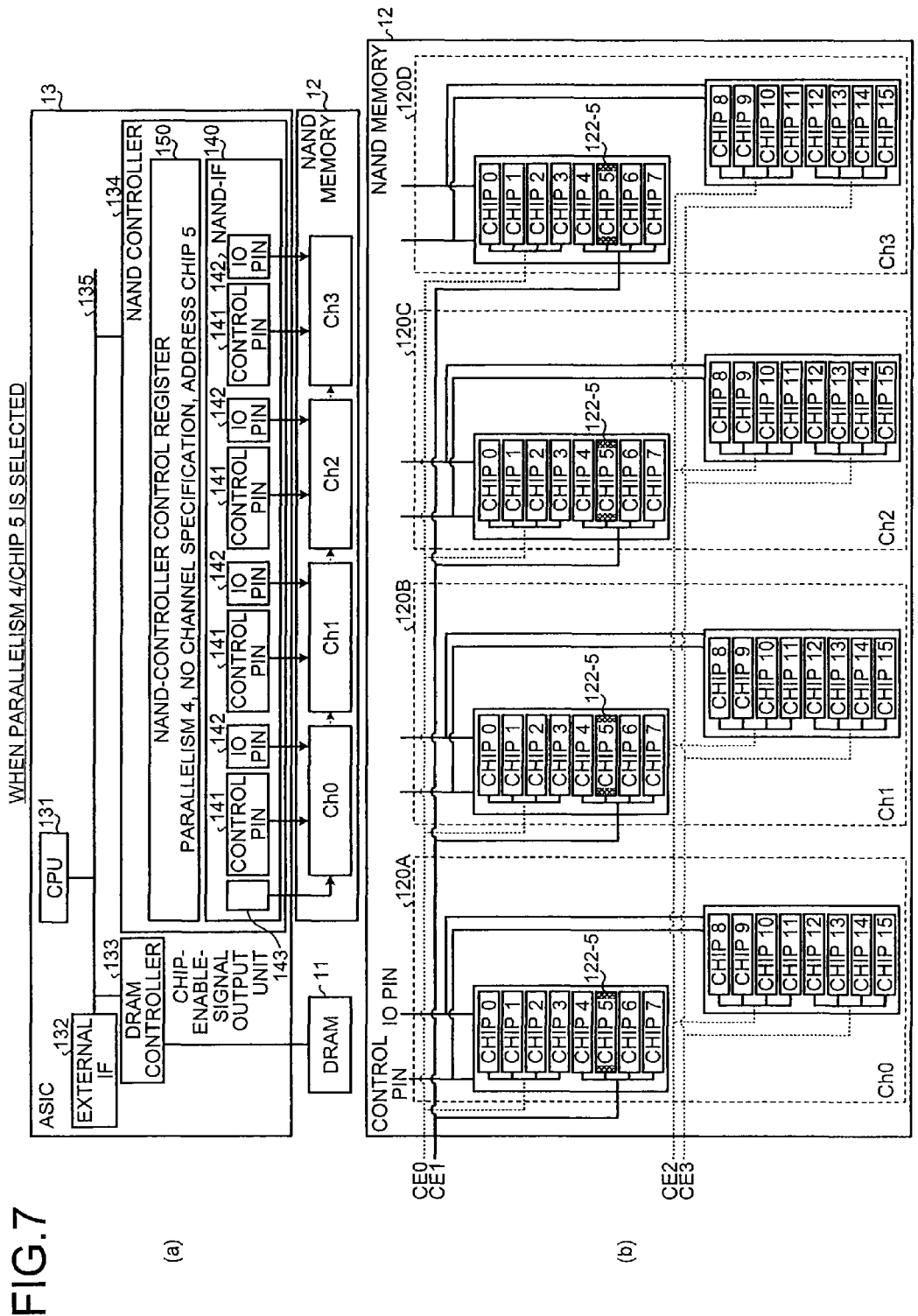
FIGS. 7(a) and 7(b) depict a processing state of data access control in a case of a 32-bit double speed mode.

FIGS. 7(a) and 7(b) depict a processing state of data access control in the case of the 32-bit double speed mode, where FIG. 7(a) depicts an outline of data access control state between the NAND controller and the NAND memory, and FIG. 7(b) depicts an input state of a signal to respective chips constituting the NAND memory. An example in which "4" is set as the parallelism (that is, the 32-bit double speed mode is set), "No specification" is specified as the channel, and "chip 122-5" is specified as the address is explained here.

As shown in FIG. 7(a), the NAND interface 140 controls all the control pins 141 and all the input/output pins 142 so that the signal is transmitted to all of the parallel operating elements 120A to 120D, upon reception of the value of the parallelism specifying register 151 and the value of the channel specifying register 152 from the NAND-controller control register 150. At this time, the NAND interface 140 controls the respective parallel operating elements 120A to 120D so that data writing and reading are performed in the double speed mode. Further, as shown in FIG. 7(b), the chip-enable-signal output unit 143 in the NAND interface 140 supplies the chip enable signal only to the address in the chip 122-5 specified by the address specifying register 153 via the chip enable signal line CE1. Accordingly, data transfer in the double speed mode in parallel of four is performed between the DRAM 11 and a predetermined address in the chip 122-5 of all the parallel operating elements 120A to 120D in the NAND memory 12.

The data transfer process is finished when transfer of data specified by the conditions specified by the NAND-controller control register 150 is finished.

In the above explanations, respective channels in the NAND memory 12 are controlled by the parallelism specifying register 151 including not only the parallelism of the channels but also the data transfer speed. However, the parallelism specifying register 151 can specify only the parallelism of the channels, and a transfer-speed specifying register for specifying the transfer speed can be separately provided to change over the normal mode and the double speed mode. According to such a configuration, combinations of the parallelism and the data transfer speed can be made more extensive by separately specifying the parallelism and the data transfer speed. In the above explanations, the parallelism can be selected only either "1" or "4"; however, the parallelism can be made selectable in a range of maximum number of channels.

Further, an example in which the processing-condition setting unit 1314 sets the processing condition such that the data to be accessed from the host device is accessed in the 32-bit double speed mode, and the data generated in the NAND memory 12 is accessed in the 8-bit normal mode has been explained above. However, in the case of the NAND memory 12 having a memory capacity of several tens of gigabytes, the size of the management information increases, and the snapshot as the backup of the management information has a size of around "block size×2×4 channels". On the other hand, the log generally has a size of around page size, because the log is the difference information. Therefore, the processing-condition setting unit 1314 can set the processing condition such that when writing and reading are performed with respect to the data to be accessed from the host device and the snapshot in the management-information storage information, these pieces of information are accessed in the 32-bit double speed mode, and when writing and reading of the log in the management-information storage information are performed, the information is accessed in the 8-bit normal mode. The same thing applies to embodiments described below.

According to the first embodiment, the parallelism of the channels 15A to 15D and the transfer speed at the time of data access to the NAND memory 12 in the NAND controller 134 are specified according to the type of data by the parallelism specifying register 151, and the channel to be used when not all the channels 15A to 15D are used is specified by the channel specifying register 152. As a result, when writing of data smaller than the predetermined size, such as the log of data generated in the memory system 10 is performed, one selected channel is used in the 8-bit normal mode, to enable writing into one selected block of the parallel operating elements 120A to 120D in a unit of page, thereby enabling to increase the writing efficiency. Further, in the case of data requiring rewrite, the parallelism is decreased, thereby enabling to avoid useless erasure of a physical block for which rewriting is not performed. On the other hand, when data equal to or larger than a predetermined size, such as data instructed from the host device or the snapshot, is written, read, or rewritten, the transfer speed is set to double the speed of the normal mode, and by increasing the parallelism (for example, parallel of four), data in a fourfold amount can be written or read at a double speed as compared to the 8-bit normal mode. Thus, an efficient writing/reading process can be performed according to the size of data to be accessed, and service life of the memory system 10 can be extended by avoiding useless erasure at the time of rewrite.

In the first embodiment, the parallelism of the channels is specified by the parallelism specifying register 151 in the NAND-controller control register 150, and the channel to be used is specified according to the specified parallelism by the channel specifying register 152. In a second embodiment of the present invention, a method of reducing the number of conditions to be set in the NAND-controller control register 150 by designing an address setting method at the time of performing data transfer by the data transfer processor is explained.

Figures 8, 9:
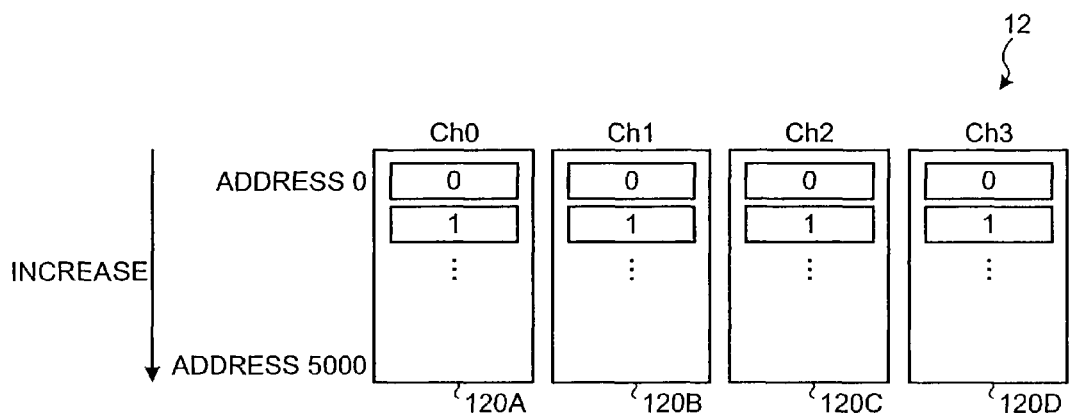
FIG. 8 is an example of an address allocating method according to a second embodiment of the present invention.

FIG. 8 is an example of an address allocating method according to the second embodiment. In the first embodiment, a case that a physical address is allocated independently to each of the parallel operating elements 120A to 120D constituting the NAND memory 12 and the range of the physical address is from 0 to 5000 is described as an example.

At this time, the data transfer processor 1311 in the CPU 131 has a function for specifying a value among 0 to 5000, which is the valid address range, as an address only for a channel connected to the parallel operating element to be accessed of the parallel operating elements 120A to 120D, and specifying a numerical value outside the valid address range, for example, 5001 as the address for a channel connected to the parallel operating element not to be accessed of the parallel operating elements 120A to 120D.

By specifying the address by the data transfer processor 1311, the parallelism of channels and the channel to be used at the time of performing the data transfer are specified. As a result, the NAND-controller control register 150 does not require the parallelism specifying register 151 and the channel specifying register 152, and needs only the address specifying register 153. Further, the processing-condition setting unit 1314 needs only to specify the address to be accessed by the data transfer processor 1311 in the address specifying register 153.

FIGS. 9(*a*) and 9(*b*) are an example of the addressing method according to the second embodiment. In this example, the data transfer processor 1311 can only select either "1" or "4" as the parallelism, and the parallelism includes information of the data transfer speed. That is, when addressing specifying the parallelism as "1" is performed, it is regarded that the 8-bit normal mode is selected, and when addressing specifying the parallelism as "4" is performed, it is regarded that the 32-bit double speed mode is selected. In the explanations below, it is assumed that identifiers of channels used for specifying the channel are Ch0, Ch1, Ch2, and Ch3, respectively.

In FIG. 9(*a*), an address (5001) invalid for designation to channels Ch0, Ch1, and Ch3 is specified in address designation information at the time of data access by the data transfer processor 1311, and an address effective for designation to channel Ch2 is specified. Therefore, it is regarded that the parallelism "1" is specified and "Ch2" is specified as the channel. As a result, the NAND controller 134 determines that it is a data accessing process in which the parallelism is "1" indicating that only channel Ch2 is used and the data access speed is the normal mode, to perform processes. At this time, the processing-condition setting unit 1314 sets the specified address in the address specifying register 153. Thus, when the process is performed with the parallelism "1", an address in an address range effective only for the channel to be used is set, and an address outside the valid address range is specified to other channels in the address designation information.

In FIG. 9(*b*), because a valid address is set to all the channels Ch0 to Ch3 in the address designation information by the data transfer processor 1311, the parallelism "4" is specified, and "no specification" is specified as the channel. As a result, the NAND controller 134 determines that it is a data accessing process in which the parallelism is "4" indicating that all the channels Ch0 to Ch3 are used with the data access speed in the double speed mode, to perform processes. At this time, the processing-condition setting unit 1314 sets the specified address in the address specifying register 153.

In the above explanations, the data transfer speed is included in the specification of the parallelism in the address setting by the data transfer processor 1311. However, the configuration can be such that a pure parallelism without including the data transfer speed is specified in the address setting by the data transfer processor 1311, and the data transfer speed is set by the processing-condition setting unit 1314 by separately providing a transfer-speed specifying register in the NAND-controller control register 150.

According to the second embodiment, when an address is set in the access designation information for the data to be accessed by the data transfer processor 1311, a value in an invalid address range is set to the parallel operating element not be accessed of the parallel operating elements 120A to 120D. Therefore, the parallelism specifying register 151 for specifying the parallelism does not need to be provided in the NAND-controller control register 150, thereby enabling to simplify the apparatus configuration of the memory system 10.

In the second embodiment, the address in a range of from 0 to 5000 is respectively allocated to each parallel operating element and an address value outside the valid address range is specified to the channel to be connected to the parallel operating element, which does not perform the data transfer process, to thereby set the parallelism, and therefore the parallelism specifying register and the channel specifying register are not provided. In a third embodiment of the present invention, a case that the parallelism is set by another address specifying method and the parallelism specifying register and the channel specifying register are not provided is explained.

Figures 10, 11:
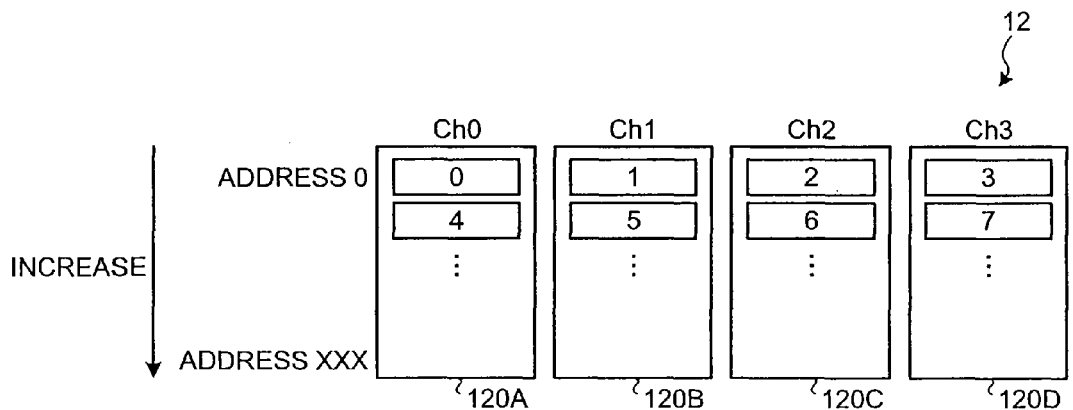
FIG. 10 is an example of an address allocating method in a NAND memory according to a third embodiment of the present invention.

FIG. 10 is an example of the address allocating method in the NAND memory according to the third embodiment. In the second embodiment, as shown in FIG. 8, the address is allocated to each of the parallel operating elements 120A to 120D constituting the NAND memory 12. However, in the third embodiment, as shown in FIG. 10, the addresses 0, 1, 2, 3 are allocated in order from the head of the parallel operating elements 120A, 120B, 120C, and 120D, and the addresses are allocated in this order thereafter to allocate one address as the entire NAND memory 12. That is, when it is assumed that n is integer equal to or larger than 0, and the address is described in decimal notation, addresses 0, 4, 8, . . . , $2n$, . . . , are allocated to the parallel operating element 120A (Ch0), addresses 1, 5, 9, . . . , $2n+1$, . . . , are allocated to the parallel operating element 120B (Ch1), addresses 2, 6, 10, . . . , $2n+2$, . . . , are allocated to the parallel operating element 120C (Ch2), and addresses 3, 7, 11, . . . , $2n+3$, . . . are allocated to the parallel operating element 120D (Ch3).

By allocating the address in this manner, in the decimal notation, when a remainder obtained by dividing the address by 4 is "0", the parallel operating element 120A (Ch0) is indicated, when the remainder is "1", the parallel operating element 120B (Ch1) is indicated, when the remainder is "2", the parallel operating element 120C (Ch2) is indicated, and when the remainder is "3", the parallel operating element 120D (Ch3) is indicated. That is, the last two digits of the address in binary notation are "00" in Ch0, "01" in Ch1, "10" in Ch2, and "11" in Ch3. Therefore, these numbers can be used as channel identification information (corresponding to parallel-operating element identification information in the claims) for identifying the channel. The presence of channel use and the parallelism can be set according to the presence of the channel identification information.

That is, the data transfer processor 1311 performs addressing so that the channel identification information of the channel is included in the data of the parallel operating element to be accessed of the parallel operating elements 120A to 120D, and the channel identification information of the channel is not included in the data of the parallel operating element not to be accessed of the parallel operating elements 120A to 120D. Specifically, the data transfer processor 1311 assigns a value (channel identification information) identifying the channel (parallel operating element) to the last two digits of the address of the data of the parallel operating element to be accessed of the parallel operating elements 120A to 120D, and assigns a value other than the value (channel identification information) identifying the channel (parallel operating element) to the last two digits of the address of the parallel operating element not to be accessed of the parallel operating elements 120A to 120D.

FIGS. 11(a) and 11(b) are an example of the address specifying method according to the third embodiment. In this example, it is assumed that the data transfer processor 1311 can only select either one of parallelisms "1" and "4", and the parallelism includes the data transfer speed. That is, when the addressing is performed so that the parallelism is "1", it is regarded that the 8-bit normal mode is selected, and when addressing is performed so that the parallelism is "4", it is regarded that the 32-bit double speed mode is selected.

In FIG. 11(a), in the access designation information by the data transfer processor 1311, an invalid address is specified as the address of channels Ch0, Ch1, and Ch3. That is, in the respective addresses to be specified to channels Ch0, Ch1, and Ch3, in the decimal notation, the remainder obtained by dividing the address by 4 should be originally 0, 1, and 3, respectively; however, in this case, the remainder is 2 for all of those channels. On the other hand, the valid address is specified only to the channel Ch2. That is, the remainder obtained by dividing the address of channel Ch2 in the decimal notation by 4 is 2. As a result, the NAND controller 134 determines that it is a data accessing process in which the parallelism is "1" indicating that only the channel Ch2 is used with the data access speed in the normal mode, to perform processes. Thus, in the case of a process performed with the parallelism "1", the address is set only to the channel to be used so that the channel identification information set to the channel is included (that is, the address to be accessed originally is set), and the address not including the channel identification information is set to other parallel operating elements.

In FIG. 11(b), a valid address is specified to all the channels Ch0 to Ch3 in the address designation information by the data transfer processor 1311. That is, the address designated to all the channels Ch0 to Ch3 includes the valid channel identification information in the respective channels Ch0 to Ch3. More specifically, the remainder obtained by dividing the respective addresses of the channels Ch0, Ch1, Ch2, and Ch3 in the decimal notation by 4 is 0, 1, 2, and 3, respectively. As a result, the NAND controller 134 determines that it is a data accessing process in which the parallelism is "4" indicating that all the channels Ch0 to Ch3 are used with the data access speed in the double speed mode, to perform processes.

In the above explanations, the data transfer speed is included in the specification of the parallelism in the address setting by the data transfer processor 1311. However, the configuration can be such that a pure parallelism without including the data transfer speed is specified in the address setting by the data transfer processor 1311, and the data transfer speed is set by the processing-condition setting unit 1314 by separately providing a transfer-speed specifying register in the NAND-controller control register 150.

According to the third embodiment, when the data transfer processor 1311 sets the address, the parallel operating element not to be accessed is set with an invalid address not including the channel identification information thereof. Therefore, the parallel specifying register 151 for specifying the parallelism and the channel specifying register 152 for specifying the channel to be used need not be provided in the NAND-controller control register 150, thereby enabling to simplify the apparatus configuration of the memory system 10.

In a fourth embodiment of the present invention, a case that an exclusive area for storing data having a low parallelism is defined in the NAND memory is explained.

Figure 12:
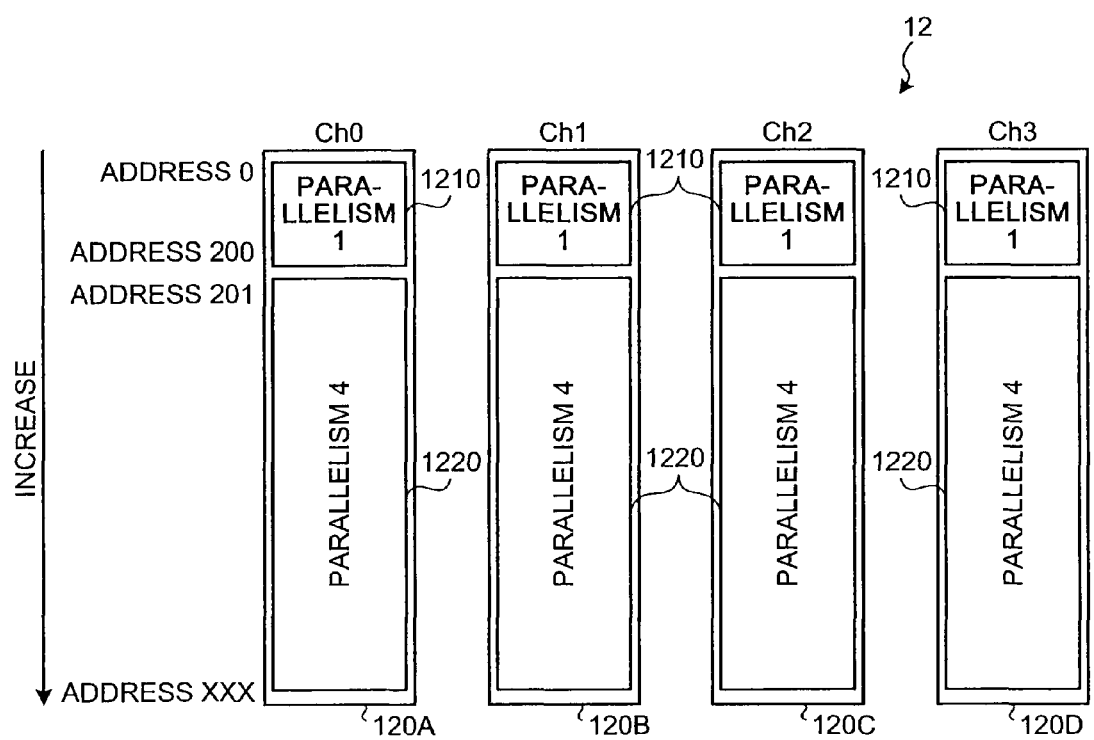
FIG. 12 is an example of area segmentation according to a parallelism in the NAND memory.

FIG. 12 is an example of area segmentation according to the parallelism in the NAND memory. As shown in FIG. 12, a low-parallelism storage area 1210 for storing low-parallelism data and a high-parallelism storage area 1220 for storing high-parallelism data are provided. That is, addressing is performed so that the low-parallelism storage area 1210 is divided. The low-parallelism storage area 1210 is in a range of from addresses 0 to 200, and the high-parallelism storage area 1220 is in a range of from addresses 201 to XXX. It is assumed that the address which becomes a boundary between the low-parallelism storage area 1210 and the high-parallelism storage area 1220 is predetermined. As a specific example of the low-parallelism storage area 1210, for example, an area for storing the management-information storage information, and more specifically, an area for storing the log in the management-information storage information can be mentioned. As a specific example of the high-parallelism storage area 1220, an area for storing data for which storage is instructed from the host device and an area for storing the snapshot in the management-information storage information can be mentioned.

This example indicates a case that the parallelism is set to either "1" or "4", and it is assumed that the parallelism includes the data transfer speed. That is, the low-parallelism storage area 1210 with the parallelism "1" is accessed at a speed in the 8-bit normal mode, and the high-parallelism storage area 1220 with the parallelism "4" is accessed at a speed in the 32-bit double speed mode.

Thus, by segmenting the area to be accessed according to the difference in the parallelism, the address can be decoded on the NAND controller 134 side and the transfer parallelism can be recognized. That is, when a destination address is 0 to 200, the area is the low-parallelism storage area 1210, and therefore the NAND interface 140 accesses the low-parallelism storage area 1210 in the 8-bit normal mode with the parallelism "1", and when the destination address is 201 to XXX, the area is the high-parallelism storage area 1220, and therefore the NAND interface 130 accesses the high-parallelism storage area 1220 in the 32-bit double speed mode with the parallelism "4".

Figure 13:
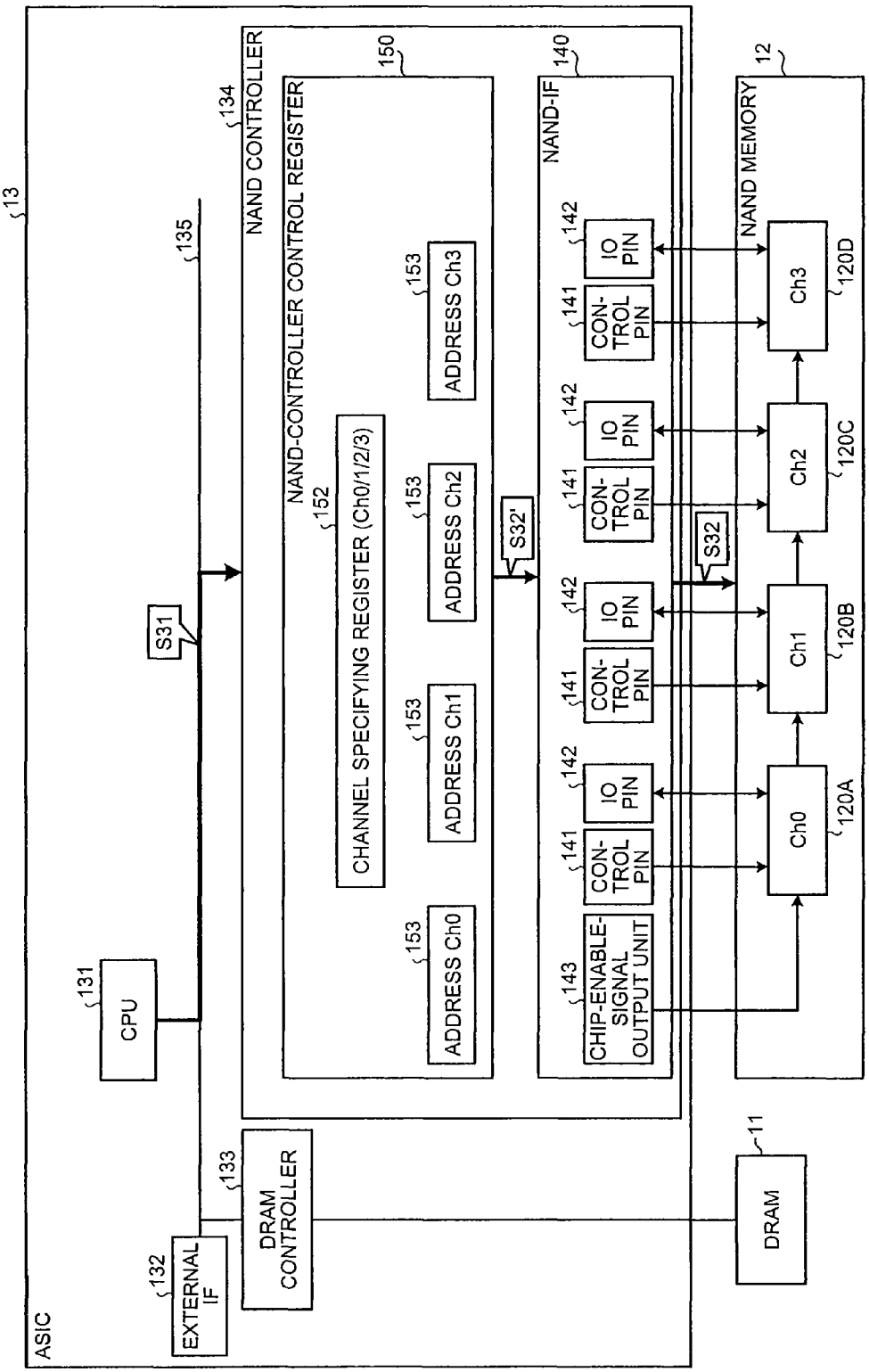
FIG. 13 is an example of a data transfer process in a memory system according to a fourth embodiment of the present invention.

An operation of the data transfer process in the memory system 10 having such a configuration is explained next. FIG. 13 is an example of the data transfer process in the memory system according to the fourth embodiment. In this example, a case that the data transfer is performed between the DRAM 11 and the NAND memory 12 is explained. The processing-condition setting unit 1314 in the CPU 131 obtains the type and address of data to be transferred between the DRAM 11 and the NAND memory 12.

The processing-condition setting unit 1314 then sets the parallel operating elements 120A to 120D corresponding to the destination address with respect to the channel specifying register 152 based on the type and address of the data, and sets the destination address with respect to the address specifying register 153 in the NAND-controller control register 150 (Step S31). When setting to the NAND-controller control register 150 by the processing-condition setting unit 1314 is complete, the data transfer process between the DRAM 11 and the NAND memory 12 by the data transfer processor 1311 is started.

The NAND interface 140 in the NAND controller 134 determines the parallelism for accessing data based on the channel specified by the channel specifying register 152 and the address specified by the address specifying register 153 in the NAND-controller control register 150, to control the parallel operating elements 120A to 120D to be used (Step S32). That is, when the address is from 0 to 200, because the destination is in the low-parallelism storage area 1210, access is performed in the 8-bit normal mode, and when the address is from 201 to XXX, because the destination is in the high-parallelism storage area 1220, access is performed in the 32-bit double speed mode. Accordingly, transfer of data transferred between the DRAM 11 and the NAND memory 12 is controlled. When data access is complete, the data transfer process finished.

At Step S32, the NAND interface 140 determines the parallelism to control the access to the respective channels in the NAND memory 12, however, the NAND-controller control register 150 can transmit the value of the channel set in the channel specifying register 152 and the destination address set in the address specifying register 153 to the NAND interface 140, so that the NAND-controller control register 150 side controls the channel (Step S32').

In the above explanations, the data transfer speed is included in the specification of the parallelism. However, the configuration can be such that the pure parallelism without including the data transfer speed is specified, and the data transfer speed is set by the processing-condition setting unit 1314 by separately providing the transfer-speed specifying register in the NAND-controller control register 150.

According to the fourth embodiment, because the NAND memory 12 is segmented into areas according to a difference in the parallelism of data to be accessed, the parallelism can be set according to the destination address, and the parallelism specifying register 151 for specifying the parallelism does not need to be provided in the NAND-controller control register 150, thereby enabling to simplify the apparatus configuration of the memory system 10.

In the fourth embodiment, a case that the low-parallelism storage area and the high-parallelism storage area are provided in the NAND memory is described. However, in a fifth embodiment of the present invention, such a configuration that the size of the low-parallelism storage area and the size of the high-parallelism storage area in the NAND memory are made variable is explained.

Figure 14:
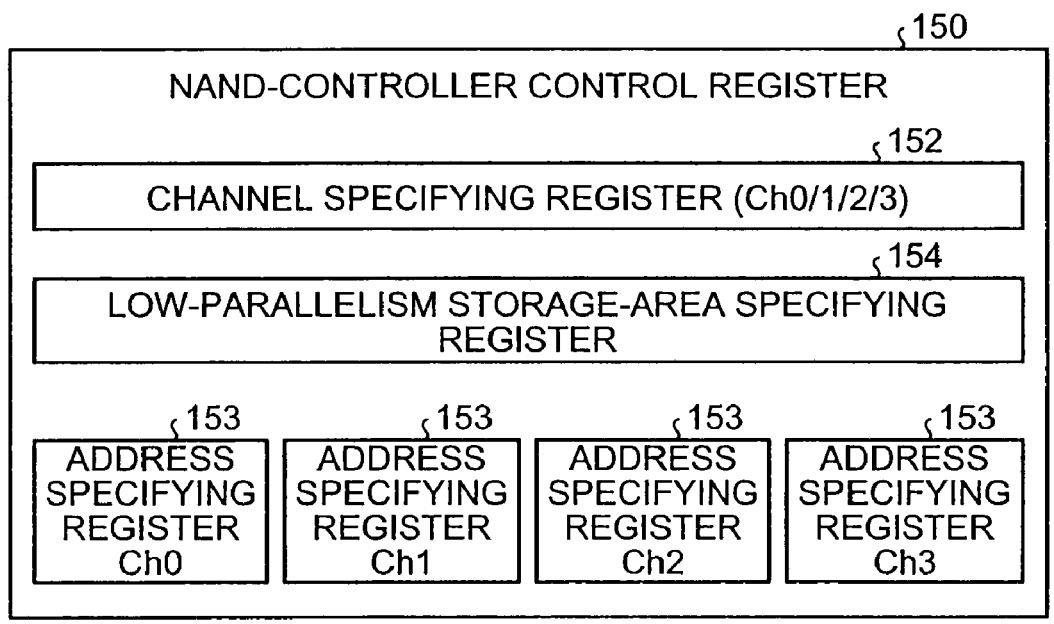
FIG. 14 schematically depicts one configuration example of a NAND-controller control register according to a fifth embodiment of the present invention.

FIG. 14 schematically depicts one configuration example of the NAND-controller control register according to the fifth embodiment. The NAND-controller control register 150 includes a low-parallelism storage-area specifying register 154 that can vary the address area of the low-parallelism storage area 1210 for storing data with a low parallelism, in addition to the channel specifying register 152 and the address specifying register 153. The low-parallelism storage-area specifying register 154 is set by the processing-condition setting unit 1314 in the CPU 131, and can vary the size of the low-parallelism storage area 1210.

Figure 15:
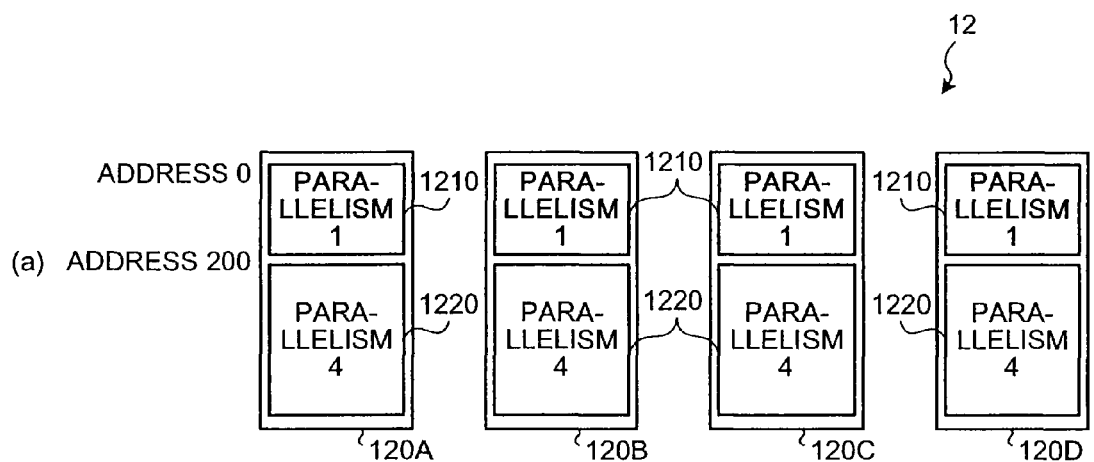
FIGS. 15(a) and 15(b) are an example when a size of a low-parallelism storage area is varied.
Figure 15:
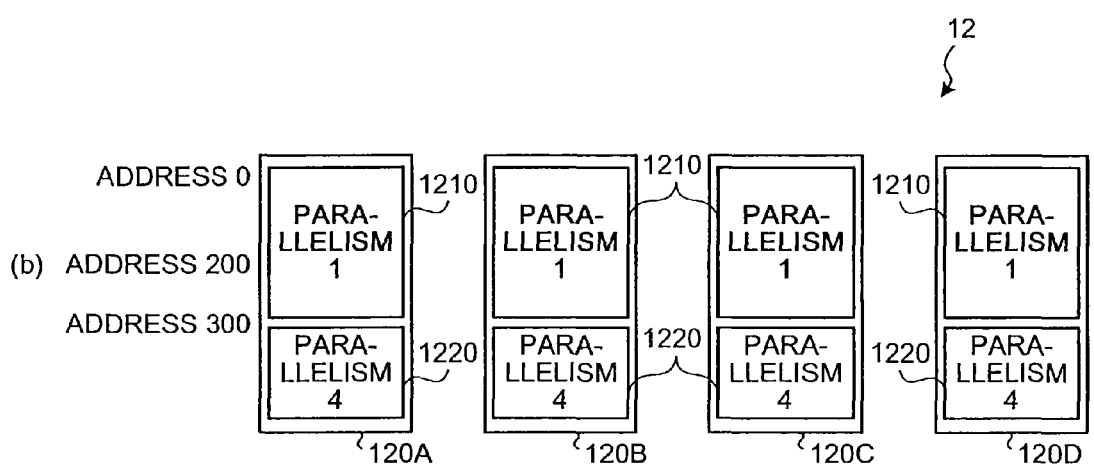

FIGS. 15(a) and 15(b) are an example when the size of the low-parallelism storage area is varied. In FIG. 15(a), the low-parallelism storage-area specifying register 154 sets the low-parallelism storage area 1210 to a range of from address 0 to address 200. On the other hand, in FIG. 15(b), the low-parallelism storage-area specifying register 154 sets the low-parallelism storage area 1210 to a range of from address 0 to address 300. In this manner, the size of the low-parallelism storage area 1210 can be changed by arbitrarily setting the value of the low-parallelism storage-area specifying register 154 by the processing-condition setting unit 1314.

In the above explanations, a case that the low-parallelism storage-area specifying register 154 that varies the address range of the low-parallelism storage area 1210 is provided is shown, however, the present invention is not limited thereto.

For example, a parallelism storage-area setting register that changes the size of the storage area for storing data of an arbitrary parallelism s (s is a natural number) can be provided. Because the data transfer process in the fifth embodiment is the same as that in the fourth embodiment, explanations thereof will be omitted.

According to the fifth embodiment, because the parallelism storage-area setting register that changes the address range in the parallelism storage area for storing data with a certain parallelism is provided, the area required for storing data with the certain parallelism can be arbitrarily set.

In the above explanations, an example in which the memory system using the NAND memory as the second storage unit has been explained, however, the present invention is not limited thereto. The NAND memory can include a memory cell transistor capable of recording multivalued data equal to or larger than 2 bits, instead of including the memory cell transistor capable of recording the binary value. The above embodiments can be applied to a case that the memory system uses another nonvolatile semiconductor memory as the second storage unit. In the above explanations, the unit of writing and reading of data in the NAND memory 12 is the unit of page size, and the unit of erasure and the unit of management are the unit of block size, however, the present invention is not limited thereto, and an arbitrary unit can be used respectively.

In the above explanations, an example of the memory system in which the first storage unit is the DRAM 11, which is a volatile memory, and the second storage unit is the NAND memory 12, which is a nonvolatile memory, has been explained, however, the present invention is not limited thereto. For example, the above embodiments can be applied to a memory system in which the first storage unit is a nonvolatile memory and the second storage unit is also a nonvolatile memory. In this case, the process of storing the management-information storage information such as the snapshot, which is the backup of the management information managed by the first storage unit (nonvolatile memory), and the log in the second storage unit (NAND memory) is not required. However, the parallelism and the data transfer speed can be varied according to the data size.

According to the present invention, data smaller than the block size and data larger than the block size can be stored without deteriorating the writing efficiency.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A memory system comprising:
a plurality of nonvolatile memories being operable in parallel with each other, each of the plurality of nonvolatile memories including a plurality of blocks;
a plurality of data channels provided for each of the plurality of nonvolatile memories, each of the plurality of data channels including data input/output lines;
a memory controller coupled with the plurality of nonvolatile memories via the plurality of data channels; and
a processor coupled with the memory controller via at least one internal bus, wherein
the memory controller is configured to:
drive all the plurality of nonvolatile memories in parallel, when writing user data provided from an external host device, thereby writing the user data in all the plurality of memories; and
drive only one part of the plurality of nonvolatile memories, when writing management data generated within the memory system, thereby writing the management data in the only one of the plurality of nonvolatile memories,
the memory controller includes at least one register storing parallelism of the plurality of nonvolatile memories, and
the processor is configured to set the parallelism in the at least one register.

2. The memory system according to claim 1, wherein the management data includes a mapping table indicating correspondence between logical addresses provided from the external host device and physical addresses of the plurality of nonvolatile memories.

3. The memory system according to claim 2, further comprising:
a volatile memory coupled with the memory controller, wherein
the volatile memory is capable of storing at least one part of the mapping table.

4. The memory system according to claim 3, wherein the management information includes difference information of before and after updating the mapping table.

5. The memory system according to claim 1, wherein the plurality of nonvolatile memories include a plurality of NAND flash memory chips.

6. The memory system according to claim 5, wherein the plurality of NAND flash memory chips include a plurality of memory planes.

7. The memory system according to claim 1, wherein each of the plurality of nonvolatile memories includes a predetermined area only storing the management data.

8. The memory system according to claim 1, further comprising:
a processor coupled with the memory controller via at least one internal bus, wherein
the memory controller includes at least one register storing a channel number of the plurality of nonvolatile memories, and
the processor is configured to set the channel number in the at least one register.

9. The memory system according to claim 1, further comprising:
a processor coupled with the memory controller via at least one internal bus, wherein
the memory controller includes at least one register storing a destination address associated with each of the plurality of data channels, and
the processor is configured to set the destination address in the at least one register.

10. A method for controlling a memory system including a plurality of nonvolatile memories being operable in parallel with each other, each of the plurality of nonvolatile memories including a plurality of blocks, the method comprising:
writing data to the plurality of nonvolatile memory via a plurality of data channels including data input/output lines;
driving all the plurality of nonvolatile memories in parallel, when writing user data provided from an external host device;
driving only one part of the plurality of nonvolatile memories, when writing management data generated within the memory system; and
storing parallelism of the plurality of nonvolatile memories in at least one register.

11. The method according to claim 10, wherein the management data includes a mapping table indicating correspondence between logical addresses provided from the external host device and physical addresses of the plurality of nonvolatile memories.

12. The method according to claim 11, further comprising:
storing at least one part of the mapping table in a volatile memory.

13. The method according to claim 12, wherein the management information includes difference information of before and after updating the mapping table.

14. The method according to claim 10, wherein the plurality of nonvolatile memories include a plurality of NAND flash memory chips.

15. The method according to claim 14, wherein the plurality of NAND flash memory chips including a plurality of memory planes.

16. The method according to claim 10, wherein each of the plurality of nonvolatile memories includes a predetermined area only storing the management data.

17. The method according to claim 10, further comprising:
storing a channel number of the plurality of nonvolatile memories in at least one register.

18. The method according to claim 10, further comprising:
storing a destination address associated with each of the plurality of data channels in at least one register.

* * * * *